United States Patent [19]

Ueno et al.

[11] Patent Number: 5,293,427

[45] Date of Patent: Mar. 8, 1994

[54] EYE POSITION DETECTING SYSTEM AND METHOD THEREFOR

[75] Inventors: Hiroshi Ueno, Yokohama; Kazuhiko Yoshida, Yokosuka, both of Japan

[73] Assignee: Nissan Motor Company, Ltd., Yokohama, Japan

[21] Appl. No.: 805,143

[22] Filed: Dec. 11, 1991

[30] Foreign Application Priority Data

Dec. 14, 1990 [JP] Japan .................. 2-402512

[51] Int. Cl.$^5$ .............................. G06K 9/00
[52] U.S. Cl. .......................... 382/1; 382/6; 382/48
[58] Field of Search ............. 351/208, 209, 210; 382/1, 2, 48, 28, 6; 340/575, 576

[56] References Cited

U.S. PATENT DOCUMENTS

| | | | |
|---|---|---|---|
| 4,625,329 | 11/1986 | Ishikawa et al. | 382/1 |
| 4,812,033 | 6/1989 | Ishikawa | 351/208 |
| 5,008,946 | 4/1991 | Ando | 382/2 |

FOREIGN PATENT DOCUMENTS

| | | |
|---|---|---|
| 60-158303 | 8/1985 | Japan . |
| 60-158304 | 8/1985 | Japan . |
| 61-77705 | 4/1986 | Japan . |
| 61-77706 | 4/1986 | Japan . |
| 64-13491 | 1/1989 | Japan . |

Primary Examiner—Joseph Mancuso
Assistant Examiner—Jon Chang
Attorney, Agent, or Firm—Lowe, Price, LeBlanc & Becker

[57] ABSTRACT

The invention detects the position of an eye in image of a driver's face quickly and with high reliability, even if the density of the driver's face image is not uniform on the right and left sides due to direct sunlight. Only one eye detection area is obtained on the dark side of the face image when the density of the face image is not uniform on the right and left sides. One eye window is detected in the one eye detection area, and an iris center is detected within the eye window to discriminate an inattentive driver who is dozing.

9 Claims, 15 Drawing Sheets

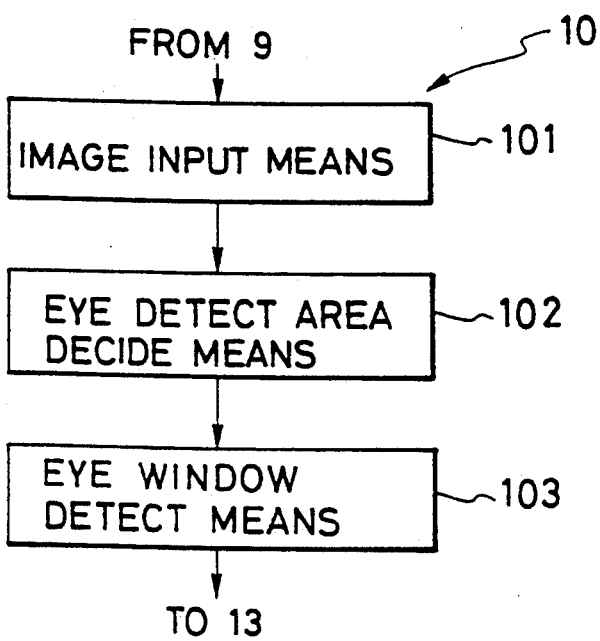
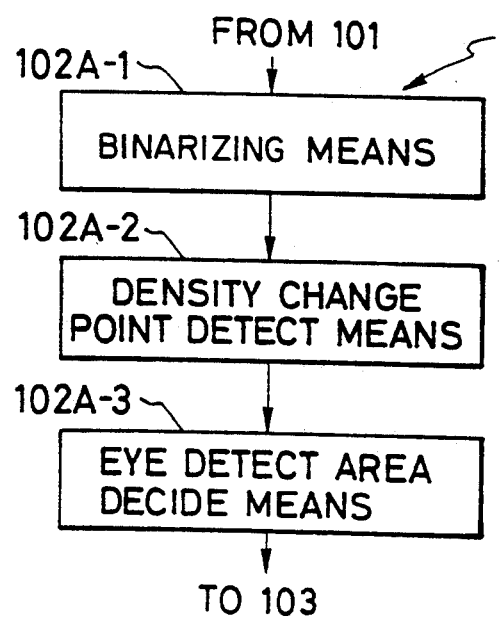
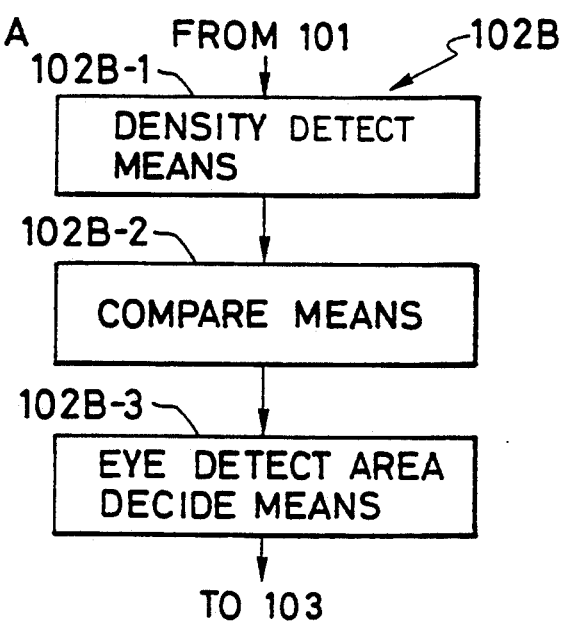

EYE POSITION DETECTING SYSTEM AND METHOD THEREFOR

BACKGROUND OF THE INVENTION

1. Field of the Invention

The present invention relates to an eye position detecting system, and more specifically to an eye position detecting system suitable for use in an automotive vehicle, to detect driver's inattentive driving due to a doze or looking aside.

2. Description of the Prior Art

The background of the present invention will be explained with respect to its application to the system used with an automotive vehicle.

As the first type of prior-art driver's eye position detecting systems for automotive vehicles, driver's eye position recognizing systems have been proposed as disclosed in Japanese Unexamined Published (Kokai) Pat. Appli. Nos. 60-158303, 60-158304, 61-77705 and 61-17706, in which an upper half of a driver face is irradiated with infrared rays emitted from two infrared stroboscopes; the reflected light is detected by two image sensors; two dark areas within the detected bright face image are extracted as two singular points; and the two extracted singular points are recognized as two eyes.

Further, as the second type of prior-art systems for automotive vehicles, an electric apparatus energizing control system has been proposed as disclosed in Japanese Unexamined Published (Kokai) Pat. Appli. No. 64-13491, in which the change in driver's eye conditions or the shape of driver's mouth speaking conditions is recognized to turn-on or off various electric apparatus such as buzzers, meters, automatic doors, relays, monitor TVs, etc.

In these prior-art eye position detecting systems, two eye existing areas are first decided before detecting eye positions. That is, a head top position of a driver face from a fixed position is detected in a face image: the detected face is divided into a few (e.g., three) areas; appropriate threshold values are determined for each areas respectively; and the lightness can be obtained as binary image signals to decide the eye existing areas.

In the first-type prior-art eye position detecting system, however, since the two dark areas within a closed bright area in a driver's face image are recognized as eye positions of singular points, when a half side of the driver's face is irradiated with direct sunlight, since the optical density (lightness) gradation on the driver face is excessively high and therefore is not uniformly detected, it is impossible to distinguish dark areas from bright areas so that eye positions cannot be detected.

Further, in the second-type prior-art eye position detecting system, when the external light conditions vary complicatedly during vehicle travelling, there exist various problems in that the driver's head position cannot be detected within the face image (being out of the detected image) so that the eye positions cannot be detected, and therefore the threshold levels must be adjusted many times according to the light density gradation in order to obtain binary image signals, thus resulting in slow response speed.

In summary, in the prior-art eye position detecting system, when the driver face is irradiated with direct sunlight, it has been difficult to accurately detect the driver eye position at high response speed and with high reliability.

SUMMARY OF THE INVENTION

With these problems in mind, therefore, it is the object of the present invention to provide an eyeball position detecting system which can accurately detect a driver's eye existing area (eye window) even if the driver's face is exposed directly to the sun so that the optical density (brightness) gradation is not uniform on the right and left sides of the face image.

To achieve the above-mentioned object, the present invention provides an eye position detecting system for detecting an eye position in a face image taken by a camera, comprising: (a) inputting means for inputting face image signals as light density gradation data; (b) deciding means for obtaining a one eye detection area on a dark side in the face image when the inputted light density gradation data are not uniform right and left beyond a predetermined density level; and (c) detecting a means for detecting one eye window in the one eye detection area in the face image when not uniform.

In the first modification, the deciding means comprises: (a) binarizing means for binarizing the inputted face image signals on the basis of a predetermined threshold level; (b) detecting means for detecting density change points in a vertical direction on the basis of the binarized image signals to check whether the light density is not uniform right and left in the face image; and (c) obtaining means for deciding only one eye detection area on one dark side in the face image when the number of the detected density change points exceeds a predetermined value. In the second modification, the deciding means comprises: (a) density detecting means for detecting light density on the basis of the image signals on both sides in the face image, separately; (b) comparing means for comparing the detected light densities on both the sides; and (c) obtaining means for deciding only one eye detection area on one dark side in the face image when a difference in light density between both sides in the face image exceeds a predetermined level.

When the eye position detecting system is applied to an inattentive driver preventing system, the system further comprises iris detecting means for detecting an iris center within the one eye window and discriminating means for discriminating on the basis of lightness change at the detected iris.

Further, to achieve the above-mentioned object, the present invention provides a method of detecting an eye position in a face image, comprising the steps of: (a) irradiating the face with infrared rays; (b) taking face images by a camera in synchronism with the infrared rays; (c) obtaining a one eye detection area on a dark side in the face image when the face image is not uniform in light density on right and left sides beyond a predetermined density level; (d) detecting one eye window in the decided one eye detection area in the face image; (e) detecting an iris center within the detected eye window to discriminate an inattentive driver on the basis of change in lightness at the detected iris.

In the first modification, the step of obtaining one eye detection area comprises the steps of: (a) determining a threshold level; (b) binarizing the face image signal on the basis of the determined threshold level; (c) detecting density change points in a vertical direction on the basis of the face image signals to check whether face light density is not uniform on right and left sides in the face image; and (d) deciding only one eye detection area on one dark side in the face image when the number of the density change points exceeds a predetermined value. In the second modification, the step of obtaining one eye detection area comprises the steps of: (a) detecting light density on the basis of the face image signals on both sides in the face image, separately; (b) comparing the detected both-side light densities; and (c) obtaining only one eye detection area on one dark side in the face image when a difference in light density between both sides in the face image exceeds a predetermined level.

In the eye position detecting system according to the present invention, when the light density in the driver face image is not uniform between the right and left side due to direct sunlight, only one eye detection area is decided on the dark side of the face image, and one eye window is detected in the decided eye detection area. Further, an iris center is detected within the detected eye window to detect an inattentive driver due to dozing for instance. Since it is unnecessary to obtain an eye detection area or to detect an eye window on the excessively bright side in the face image, the image signal retrieval area can be reduced and further the eye position detection precision can be improved.

BRIEF DESCRIPTION OF THE DRAWINGS

FIG. 2 is a block diagram showing the eye window detecting section shown in FIG. 1;

FIG. 2A is a detailed block diagram showing a first modification of the eye detection area deciding means shown in FIG. 2;

FIG. 2B is a detailed block diagram showing a second modification of the eye detection area deciding means shown in FIG. 2;

DETAILED DESCRIPTION OF THE PREFERRED EMBODIMENTS

Embodiments of the eye position detecting system suitable for use in an automotive vehicle according to the present invention will be described hereinbelow with reference to the attached drawings.

Figure 1:
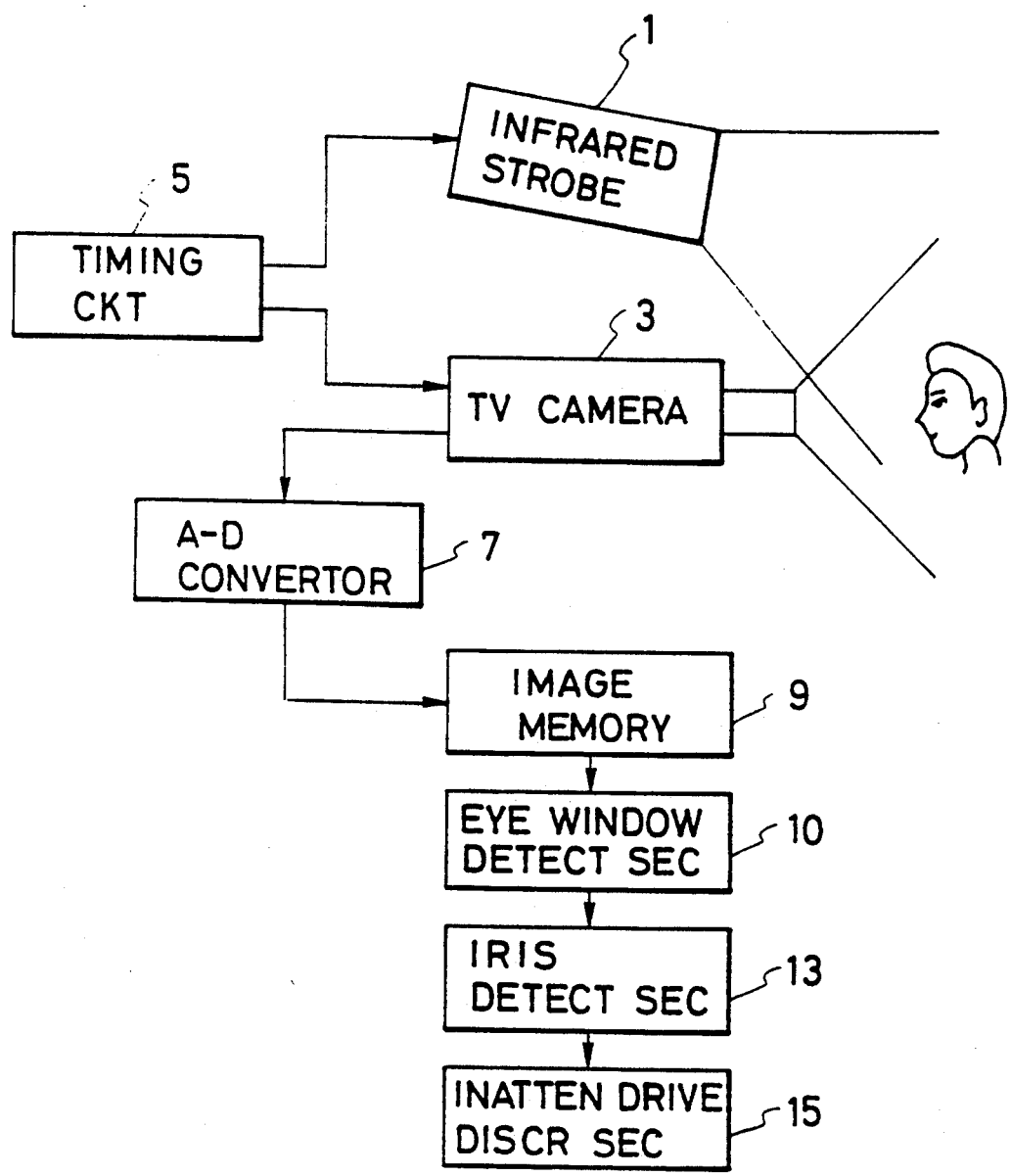
FIG. 1 is a schematic block diagram showing an embodiment of the eye position detecting system according to the present invention.
Figure 4:
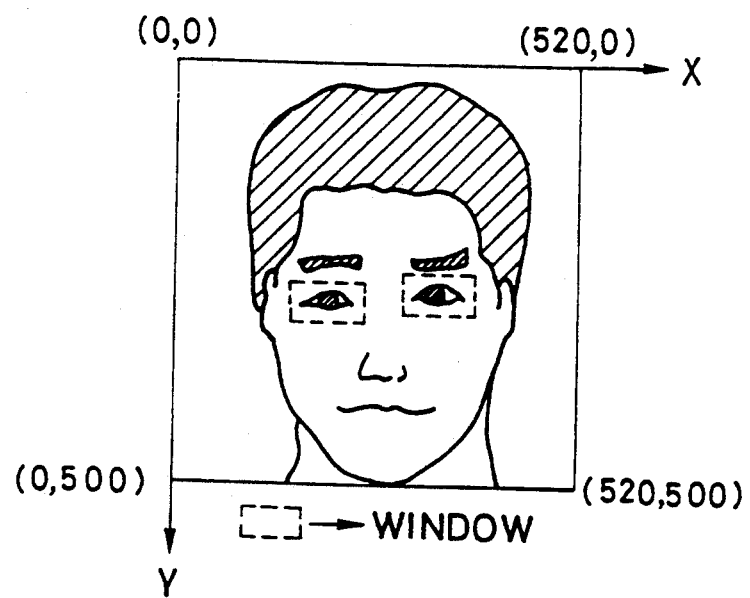
FIG. 4 is an illustration for assistance in explaining a uniform lightness face image including two eye windows.

In FIG. 1, the system comprises an infrared strobe 1. a TV camera 3, a timing circuit 5, an A-D convertor 7, an image memory 9, an eye existing area (window) detecting circuit 10, an iris detecting circuit 13 and an inattentive drive discriminating circuit 15. The infrared strobe 1 is disposed within an instrument panel (not shown) to transmit infrared rays upon a driver face looking correctly frontward. The TV camera 3 takes images of driver face irradiated with the infrared rays emitted from the infrared strobe 1. The timing circuit 5 matches the timing at which the infrared rays are emitted from the strobe 1 with that at which a driver face image is taken by the TV camera 3. That is, when a strobe activating command is outputted from the timing circuit 5 to the infrared strobe 1, the strobe 1 generates infrared rays to irradiate the driver face with the infrared rays. Simultaneously, when an image taking command is outputted from the timing circuit 5 to the TV camera 3, the camera 3 takes an image of the driver face irradiated with the infrared rays. The image taken by the TV camera 3 is composed of 520 horizontal (X) direction picture elements (pixels) and 500 vertical (Y) direction picture elements (pixels) as shown in FIG. 4 and the field angle of the image is so adjusted that the whole face can appear full in the face image.

The A-D convertor 7 converts analog image signals obtained by the TV camera 3 into digital image signals, and the image memory 9 stores these digital image signals. The eye existing area (window) detecting section 10 detects an area or areas within which two eyes exist on the basis of the image signals stored in the image memory 9. The iris detecting section 13 detects an iris position by processing the image signals within the area detected by the eye window detecting section 10. The inattentive drive discriminating section 15 discriminates the presence or absence of inattentive driving (e.g., a doze, looking aside) on the basis of the result detected by the iris detecting section 13.

With reference to FIG. 2, the eye window detecting section 10 comprises image inputting means 10 for inputting image signals stored in the image memory 9, frame by frame as light density gradation data; eye detection area (dark face side) deciding means 102 for checking whether the inputted light density gradation data in the face image is uniform right and left, and deciding one eye detection area on a dark side in the face image when not uniform right and left beyond a predetermined level; and eye window detecting means 103 for detecting one eye window in the decided one eye detection area in the face image when not uniform.

In the first modification of the embodiment, as shown in FIG. 2A, the eye detection area deciding means 102A comprises binarizing means 102A-1 for binarizing the inputted face image signal on the basis of a predetermined threshold level to emphasize the lightness and darkness of the face image; density change point detecting means 102A-2 for detecting density change points in a vertical direction on the basis of the binarized image signals to check whether the light density is not uniform right and left in the face image; and eye detecting area deciding means 102A-3 for deciding only one eye detection area on one dark side in the face image when the number of the detected density change points exceeds a predetermined value.

In the second modification of the embodiment, as shown in FIG. 2B, the eye detection area deciding means 102B comprises density detecting means 102B-1 for detecting light density on the basis of the image signals on both sides in the face image, separately; comparing means 102B-1 for comparing the detected both-side light density to check whether the face image is uniform right and left; and eye detection area deciding means 102B-3 for deciding only one eye detection area on one dark side in the face image when a difference in light density between both sides in the face image exceeds a predetermined level.

The entire operation of the system will be explained hereinbelow with reference to the flowchart shown in FIG. 3.

Images of driver's face area are taken by the TV camera 3 in synchronism with infrared rays generated by the infrared strobe 1 (in step S1). The image signals are converted into digital image signals via the A-D convertor 7 and then stored in the image memory 9 frame by frame (in step S2). In this conversion process, the digital video signals are converted into 256 gradation data from 0 to 255 where 0 denotes the darkest gradation and 255 denotes the whitest gradation. The image data stored in the image memory 9 are read and inputted to the eye window detecting section 10 (in step S3) in order to decide one eye detection area on the darker side in the face image when the face image is not uniform in light density right and left beyond a predetermined density level (in step S4).

One eye window is detected in the decided one eye detection area in the face image (in step S5). An iris center is detected within the detected eye window (in step S6) to discriminate an inattentive drive on the basis of change in lightness at the detected iris (in step S7).

Figure 3:
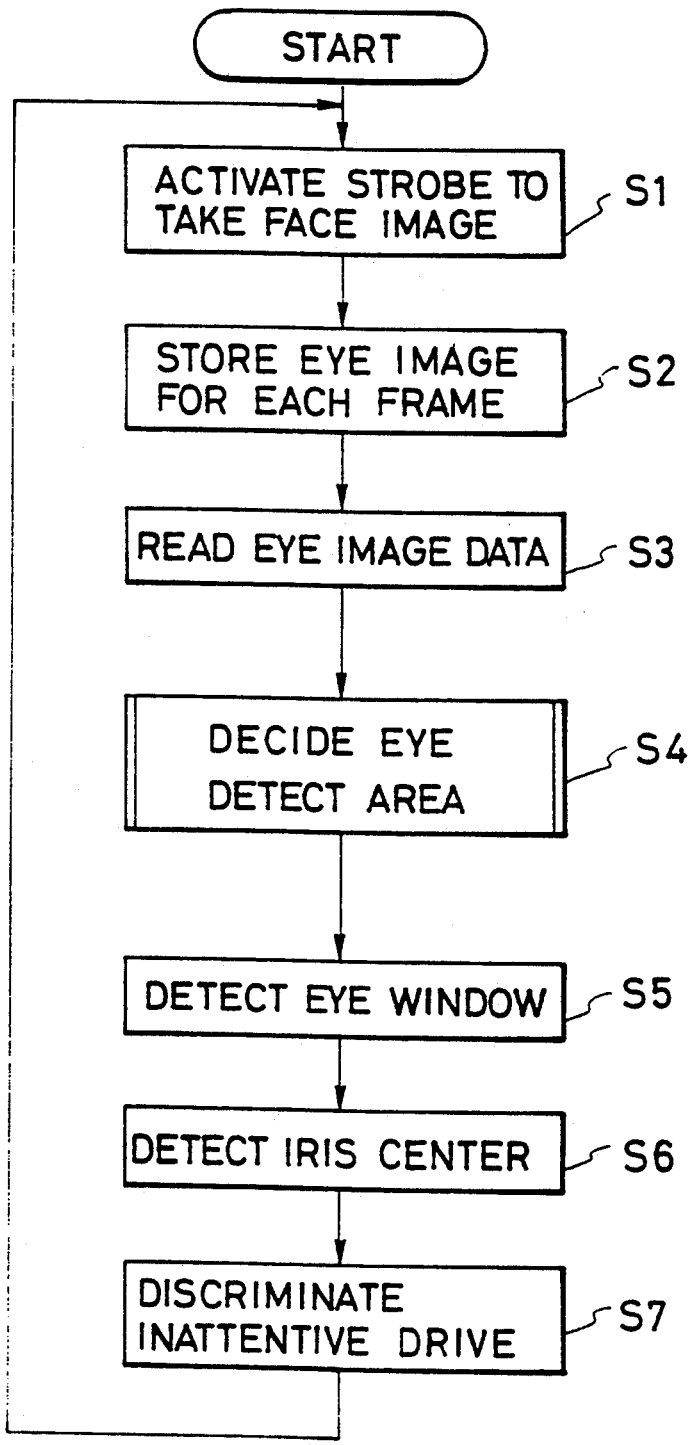
FIG. 3 is a flowchart for assistance in explaining the operation of the detecting system shown in FIG. 2.
Figure 3A:
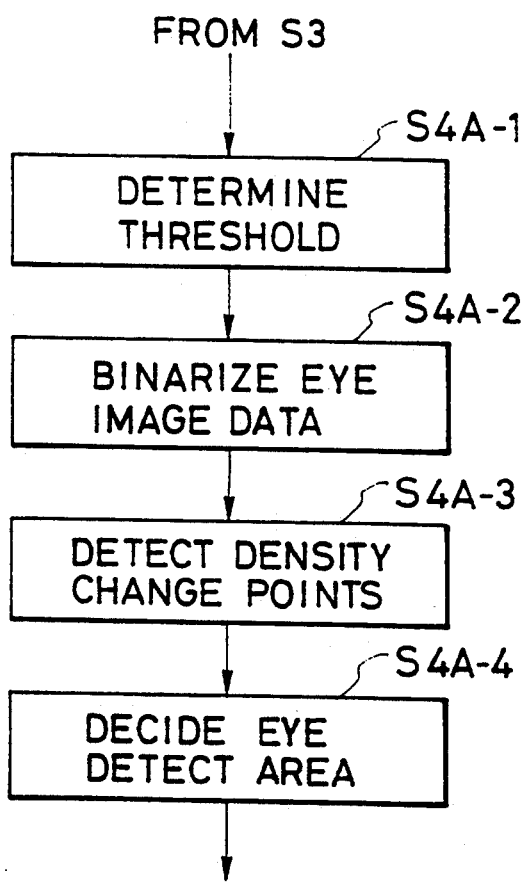
FIG. 3A is a flowchart for assistance in explaining a first modification of the step of deciding eye detection area shown in FIG. 3.
Figure 6:
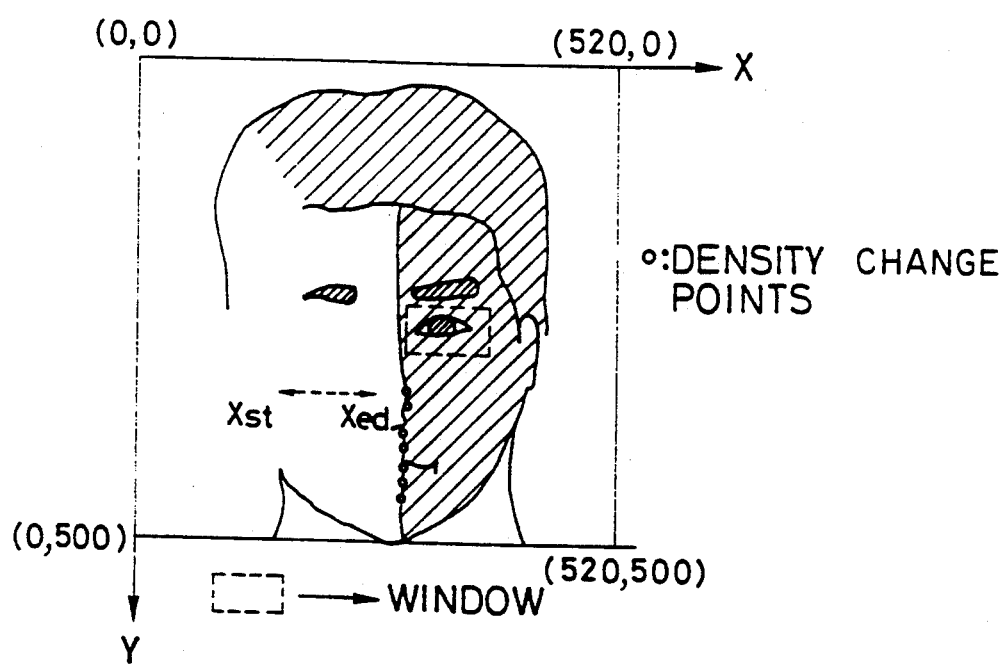
FIG. 6 is an illustration for assistance in explaining a non-uniform lightness face image including one eye window.

As shown in FIG. 3A, in the first modification of the step of deciding one eye detection area (dark face side) (step in S4), a threshold level is determined in accordance with an appropriate image processing such as discrimination analysis method, differential histogram method, etc. (in step S4A-1). The face image signal is binarized on the basis of the determined threshold level to emphasize the difference in lightness in the face image (in step S4A-2). Density change points are detected in a vertical direction on the basis of the face image signals to check whether face light density is not uniform right and left in the face image (in step S4A-3). When the number of the density change points exceeds a predetermined value, since this indicates that the face image is not uniform on right and left sides in light density, only one eye detection area is determined on one dark side in the face image (in step S4A-4), as shown in FIG. 6.

Figure 3B:
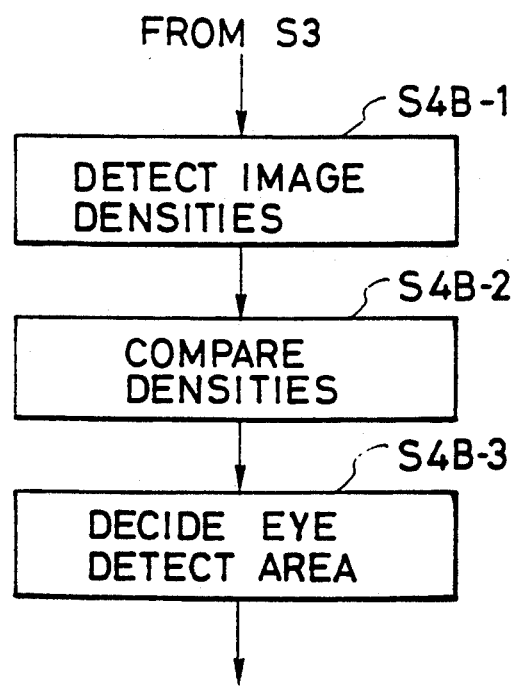
FIG. 3B is a flowchart for assistance in explaining a second modification of the step of deciding eye detection area shown in FIG. 3.

As shown in FIG. 3B, in the second modification of the step of deciding one eye detection area (dark face side) (in step S4), the light density is detected on the basis of the face image signal on both sides in the face image, separately (in step S4B-1). The detected light densities on both sides are compared to determine which side is darker in the face image (in step S4B-2). Further, only one eye detection area is obtained on one dark side in the face image when a difference in light density between both sides in the face image exceeds a predetermined level (in step S4B-3), as shown in FIG. 6.

Figure 5:
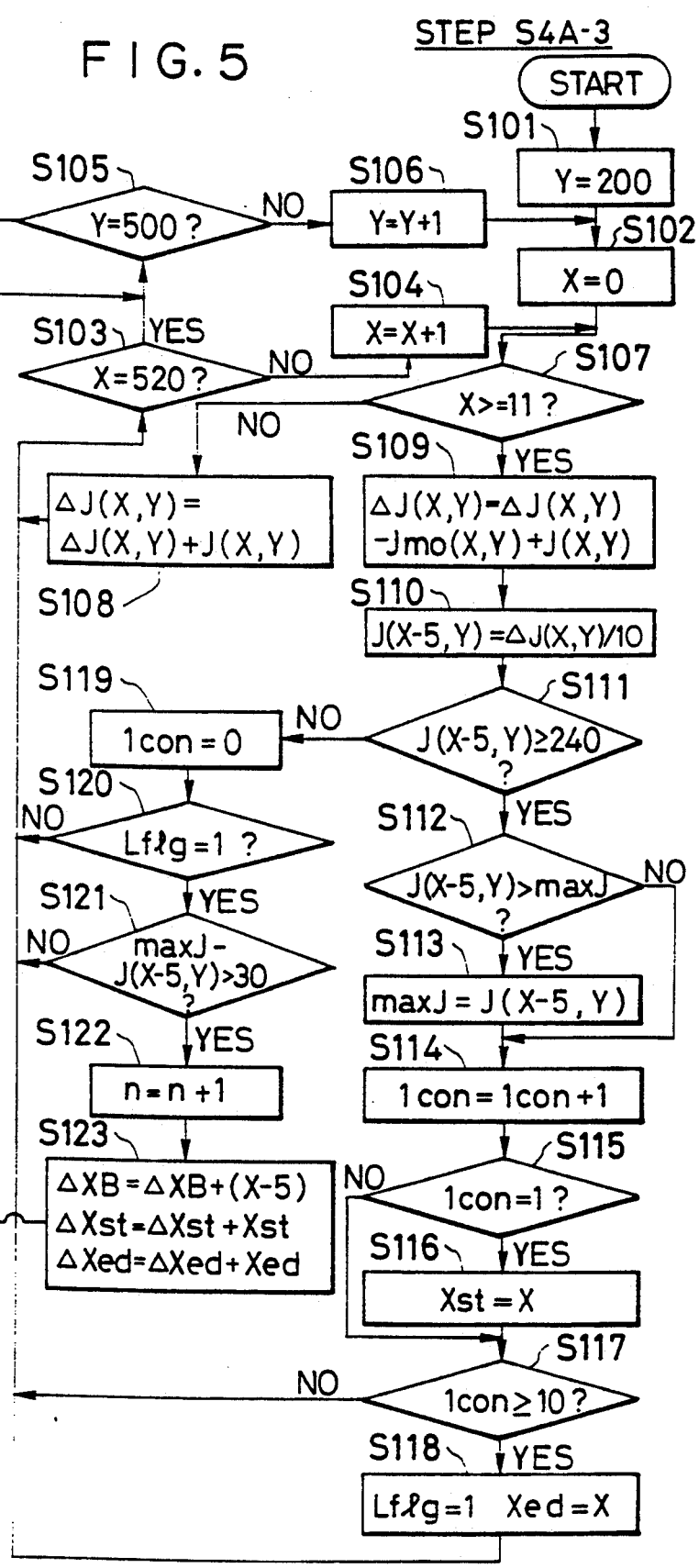
FIG. 5 is a flowchart for assistance in explaining the procedure of the first modification of the step of deciding eye detection area shown in FIG. 3A.

FIG. 5 is a detailed flowchart for assistance in explaining the steps of detecting density change points in the face image (step S4A-3) and deciding one eye detection area (in step S4A-4) of the first modification. In this flowchart, control roughly executes the following steps: (a) retrieving a predetermined number of binarized image signals at pixels in a horizontal direction within a lower half area of the face image; (b) calculating an average density on the basis of the retrieved image signals; (c) checking whether the calculated average density is beyond a predetermined value to determine a continuous bright portion along the horizontal direction; (d) checking whether the calculated average density is below another predetermined value to detect a density change point in the horizontal direction; (e) repeating the above steps (a) to (d) along a vertical direction; (f) counting the number of density change points along the vertical direction; (g) if the counted number of the density change points is less than a predetermined value, determining that the light density is uniform on right and left sides of the face image to decide two eye detection areas on both sides in the face image; and (h) if the counted number of the density change points is the predetermined value or more, determining that the light density is not uniform right and left in the face image to decide one eye detection area on the side where the continuous bright portion has not been checked.

In more detail, control first sets the vertical scanning coordinate value to y=200 (in step S101) and the horizontal scanning coordinate value to X=0 (in step S102). The reason why the vertical scanning coordinate value is set to Y=200 is to securely detect density change points at only the lower half of the face. The horizontal scanning coordinate value X is incremented pixel by pixel (in step S104) until X reaches 520 to cover the retrieve range (x=520) (in step S103).

Further, whenever the image signals along the horizontal line have been detected, the vertical scanning coordinate value Y is incremented pixel by pixel (in step S106) until Y reaches 500 to cover the retrieve range (Y=500) (in step S105).

The controller checks whether the accumulated retrieved pixels in the X direction numbers 11 pixels or more (in step S107). If less than 11 pixels, control accumulates ten pixels (in step S108), where $\Delta J(\Delta J(X,Y), \Delta J (X-1,Y), \ldots)$ denote an accumulated pixels. If 11 pixels or more (in step S107), an old pixel density $J_{mo}$ (X, Y) (retrieved before ten pixels are retrieved) is omitted and a newly retrieved pixel density J (X, Y) is added (in step S109). The new ten-pixel density thus obtained is averaged to obtain an average density $\Delta J$ (X, Y)/10 and is set again as a current density J (X-5, Y) at a pixel 5 pixels before the current pixel (in step S110).

The controller checks whether the newly set pixel density is 240 gradation or more (very bright) (in step S111). If 240 gradation or more, the controller compares the maximum value max J of the densities so far stored with the current pixel density J (X-5, Y) (in step S112). If J (X-5, Y) is larger than max J, J (X-5, Y) is set to a new maximum pixel density max J (in step 113) and counts up a continuation counter $1_{con}$ indicative of a continuous bright portion (in step S114). The controller further checks whether the continuation counter $1_{con}$ is 1 (in step S115). If $1_{con}=1$, the coordinate value X at this moment is stored as a bright continuation start point $X_{st}$ (in step S116), as shown in FIG. 6. If $1_{con}$ is not 1 (in step S115), the controller checks whether the continuation number of the bright portion is 10 or more (in step S117). If 10 or more, a continuation flag Lflag is set and the coordinate value X at this time is stored as a bright continuation end point $X_{ed}$ (in step S118), as shown in FIG. 6.

If the pixel density is 240 gradation or less in step S111, the continuation counter $1_{con}$ is cleared (in step S119). Further, the controller checks whether the continuation flag Lflag is set (in step S120). If not set, since this indicates that the continuous portion is not yet detected, the controller proceeds to step 103 to retrieve the successive pixel. If set in step S120, the controller checks whether a difference between the maximum pixel density max J and the current pixel density J (X-5, Y) is 30 gradation or more (becomes darker) (in step S121). If less than 30 gradation (not darker), the controller retrieves the succeeding pixel (in step S103). If gradation is 30 or more (darker) in step S121, the controller determines the current pixel density as a density change point, counts up the density change point counter n (in step S122), accumulates the density change point coordinate value X, the bright continuation start point $X_{st}$ and the bright continuation and point $X_{ed}$, and stores these as $\Delta XB$, $\Delta X_{st}$ and $\Delta X_{ed}$ (in step S123). Under these conditions, since the density change point at the current retrieve line X has been detected, the controller proceeds to step S105 to increment the retrieve line Y. The above-mentioned processing is repeated until Y=500 (th lowermost point of the face image). That is, if Y=500 (in step S105), the controller proceeds to the steps of deciding an eye detection area (face side) (in steps S124 and after).

The controller first checks whether the density change point n is 20 or more (in step S124). If less than 20, the controller sets the eye retrieve range flag Sflg to N (in step S128). This indicates that the image density is uniform, so that the eye detection area is on both the sides of the face image, respectively. If n is 20 or more (in step S124), since the image is not uniform, control calculates an average coordinate value XB of the density change point, an average coordinate value $X_{st}$ of the bright continuous portion start point and an average coordinate value $X_{ed}$ of the bright continuous portion end point by dividing these accumulated values $\Delta XB$, $\Delta X_{st}$ and $\Delta X_{ed}$ by detection number n of the density change points (in step S125).

Thereafter, the controller calculates the continuous portion start point position LL and the same end point position LR with the X=250 as the central point of the image (in step S126). The controller compares the start point position LL with the end point position LR (in step S127). If LL>LR, since this indicates that the continuous portion is located on the left side, the controller sets the eye retrieve range flag Sflg to L (in step S129) to determine that the eye detection area is located on the right side of the density change point. If not LL>LR, since this indicates that the continuous portion is located on the right side, the controller sets the eyeball retrieve range flag Sflg to R (in step S130) to determine that the eye detection area is located on the left side of the density change point.

FIG. 6 shows an example of the face image obtained when the left half of the face image is directly irradiated with sunlight. Therefore, the density change points are denoted by white circles roughly at the center of the face image and the bright continuous portion is located on the left cheek as denoted by a start point $X_{st}$ and an end point $X_{ed}$.

Figure 7:
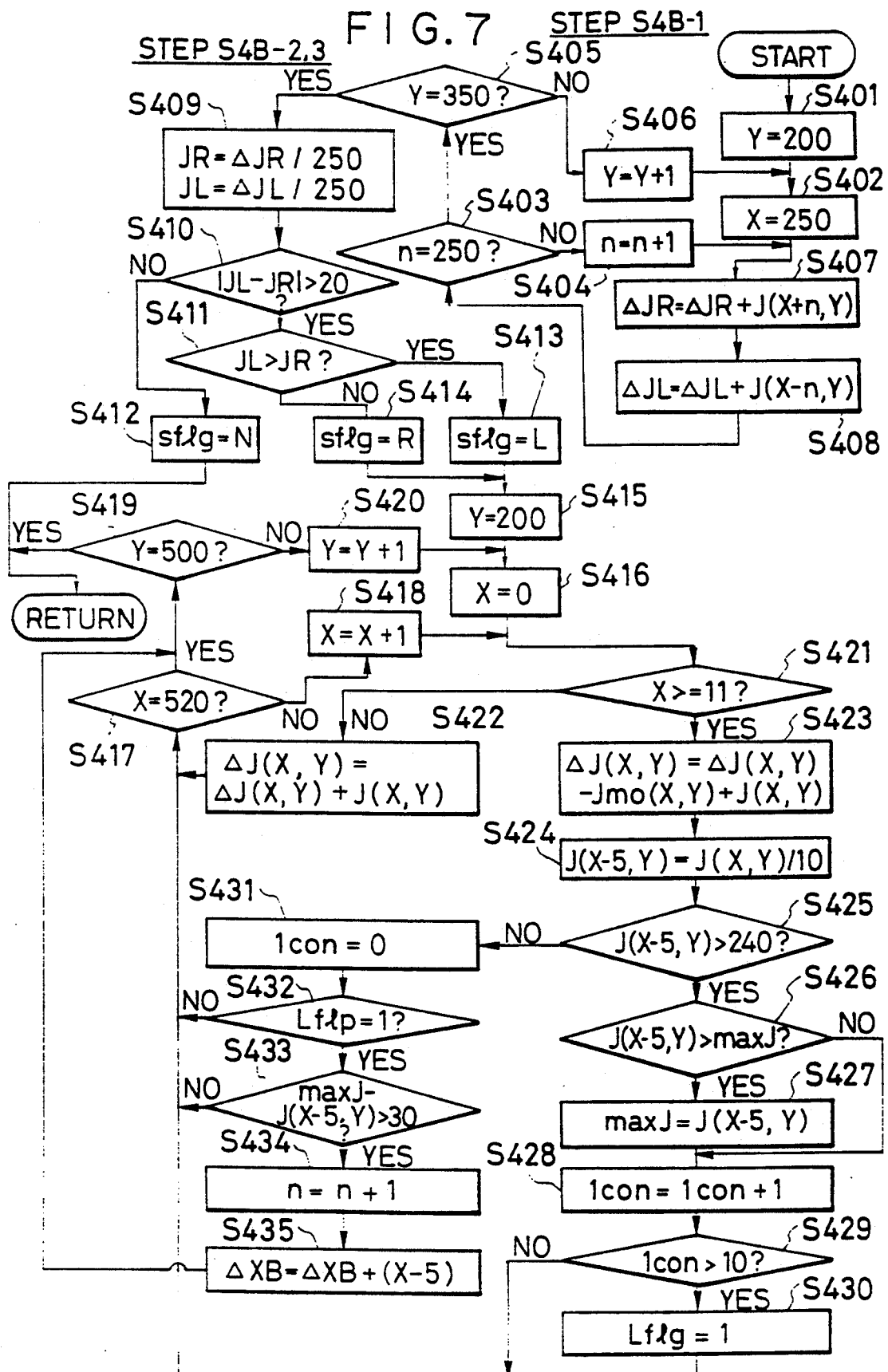
FIG. 7 is a flowchart for assistance in explaining the procedure of the second modification of the step of deciding eye detection area shown in FIG. 3B.

FIG. 7 is a detailed flowchart for assistance in explaining the steps of detecting image densities (step S4B-1), comparing the detected densities (step S4B-2) and deciding the eye detection area (step S4B-3) of the second modification. In this flowchart, the controller roughly executes the following steps: (a) retrieving a predetermined number of image signals at pixels in a horizontal direction within a lower half area of the face image beginning from the center to the right and left, respectively; (b) calculating an average density on the basis of the retrieved image signals on the right and left sides, respectively; (c) repeating the above steps (a) and (b) in a predetermined vertical range; (d) checking whether a difference in average density between the right and left sides is beyond a predetermined value; (e) if the checked difference is less than a predetermined value, determining the light density is uniform right and left in the face image to decide two eye detection areas on both sides in the face image; (f) if the checked difference is the predetermined value or more, determining that of the light density is not uniform between right and left sides in the face image to decide one eye detection area; (g) comparing the right and left densities; and (h) if the right average density is higher than the left average density, determining the eye detection area on the left side of the face image; and if the left average density is higher than the right average density, determining the eye detection area on the right side of the face image.

In more detail, the controller first discriminates the non-uniformity of image density on the basis of a difference in average density between the right and left sides from the central point in the face image, to determine the eye detection area on the basis of the discriminated non-uniformity.

The controller sets the vertical scanning Y coordinate value to Y=200 (in step S401) and the horizontal scanning X coordinate value as X=250 (in step S402).

The horizontal retrieve number n is incremented pixel by pixel (in step S404) until n reaches 250 to cover the left side retrieve range (X=0 to 250) and the right side retrieve range (X=250 to 500) (in step S403). Further, whenever one retrieve line X has been detected, the horizontal retrieve line Y is incremented pixel by pixel (in step S406) until Y reaches 350 to cover the retrieve range (Y=350).

The controller calculates a right accumulation value AJR on the right side (X=250 to 500) density in the face image (in step S407) and a left accumulation value AJL of the left side (X=0 to 250) density in the face image (in step S408). Further, controller calculates an average right side density JR and an average left side density JL (in step S409). The controller checks whether a difference between the left and right is more than 20 (in step S410). If 20 or less, the controller sets the eye retrieve range flag Sflg to N to determine the eye detection range on the entire face image (in step S412).

If more than 20 (in step S410), since this indicates that the image density is not uniform, the controller compares the left and right average densities JL and JR (in step S411). If JL>JR, the controller sets the eye retrieve range flag Sflg to L (in step S413) to determine the eye detection area on the right (dark) side of the density change point. If JL<JR, the controller sets the eye retrieve range flag Sflg to R (in step S414) to determine the eye detection area on the left (dark) side of the density change point.

Thereafter, the controller detects density change points (in steps S415 to S435). These steps are the same as the steps S101 to S123 of the flowchart shown in FIG. 5, except the steps of calculating the start and end points $X_{st}$ and $X_{ed}$ of the bright continuous portion (in step S123).

Figure 8:
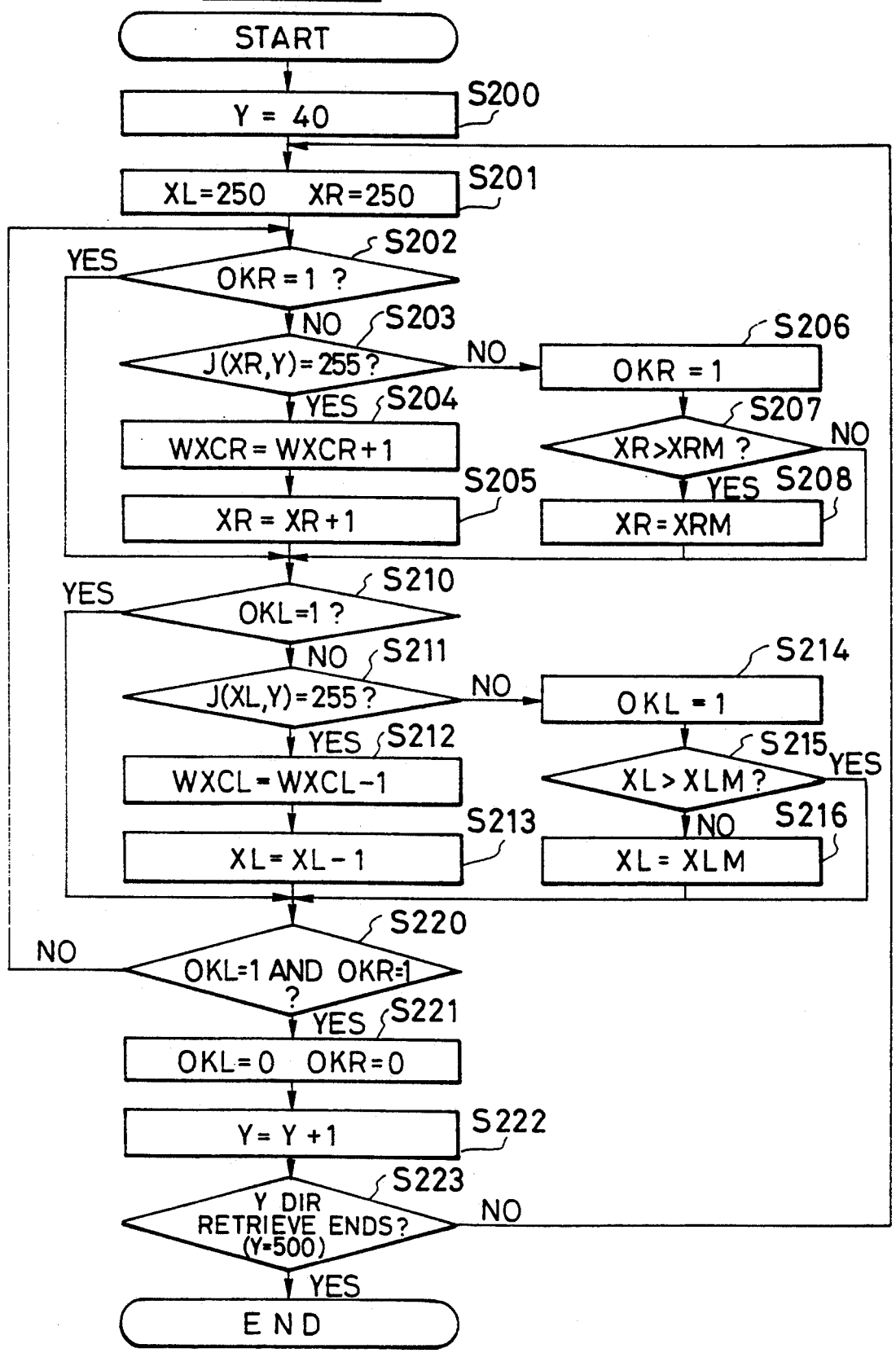
FIG. 8 is a flowchart for assistance in explaining the procedure of the step of deciding the horizontal positions of an eye window.
Figure 9A:
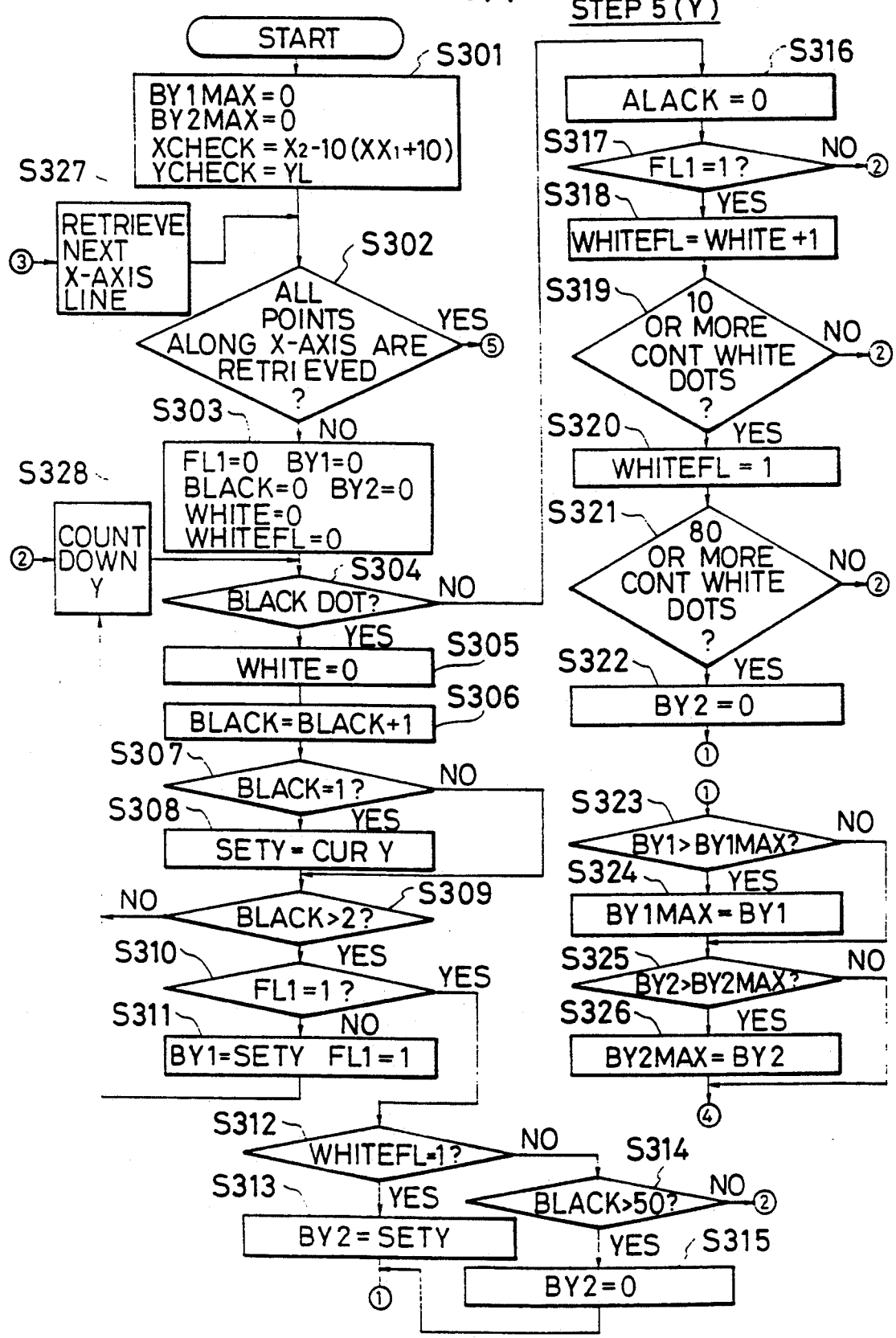
FIGS. 9A and 9B are flowcharts for assistance in explaining the procedure of the step of deciding the vertical positions of an eye window under consideration of the presence or absence of eyeglasses.
Figure 9B:
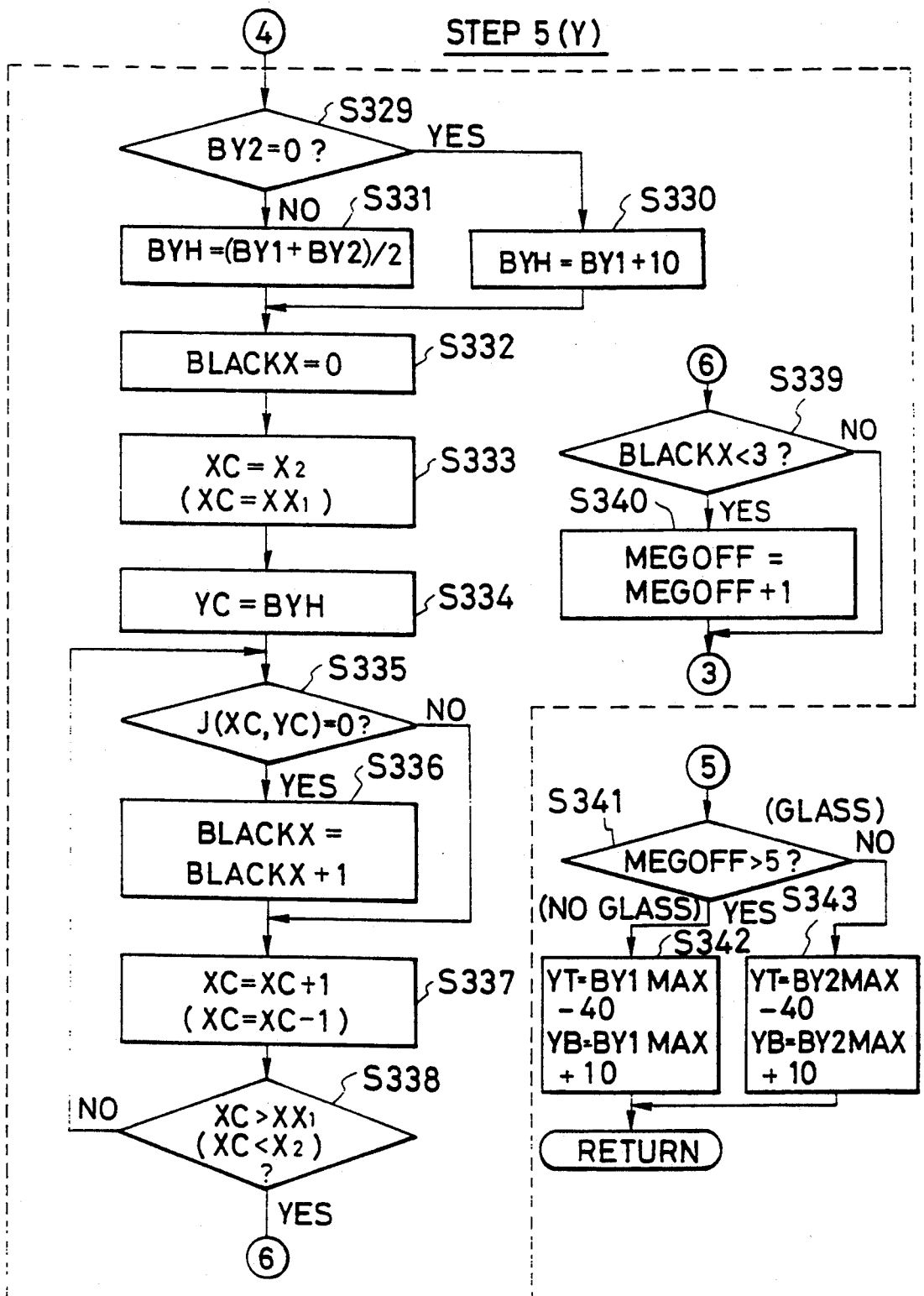

FIG. 8, 9A and 9B are detailed flowcharts for assistance in explaining the steps of deciding the horizontal and vertical positions of right and left eye windows (step S5). In these flowcharts, the controller roughly executes the following steps of: (a) determining a central line of the face image; (b) retrieving image densities at pixels in a horizontal direction beginning from the determined central line to the left side in the face image; (c) determining a face left end point on the basis of a continuous bright portion along the horizontal direction; (d) retrieving image densities at pixels in a horizontal direction beginning from the determined central line to the right side in the face image; (e) determining a face right end point on the basis of a continuous bright portion along the horizontal direction; (f) repeating the above steps (a) to (e) along a vertical direction to determine both the left and right face end points; (g) determining left and right side positions ($X_1$, $X_2$) of the left eye window and left and right side positions ($XX_1$, $XX_2$) of the right eye window on the basis of both the determined face end points; (h) retrieving image densities at pixels in a vertical direction at regular horizontal pixel intervals; (i) determining an eyeball lowest end point (BY1) and an eyebrow lowest end point (BY2) on the basis of a continuous dark portion along the vertical direction, respectively; (j) determining an eyeglass detecting vertical position value (BYH) between the two end points (BYI and BY2); (k) detecting a dark bridge portion of an eyeglass frame along the horizontal direction at the vertical position value (BYH); and, (l) if no eyeglass is detected, determining upper and lower end points (YT, YB) on the basis of the eyeball lowest end point (BY1), and if eyeglasses are detected, determining the upper and lower end points (YT, YB) on the basis of the eyebrow lowest end point (BY2).

Figure 10:
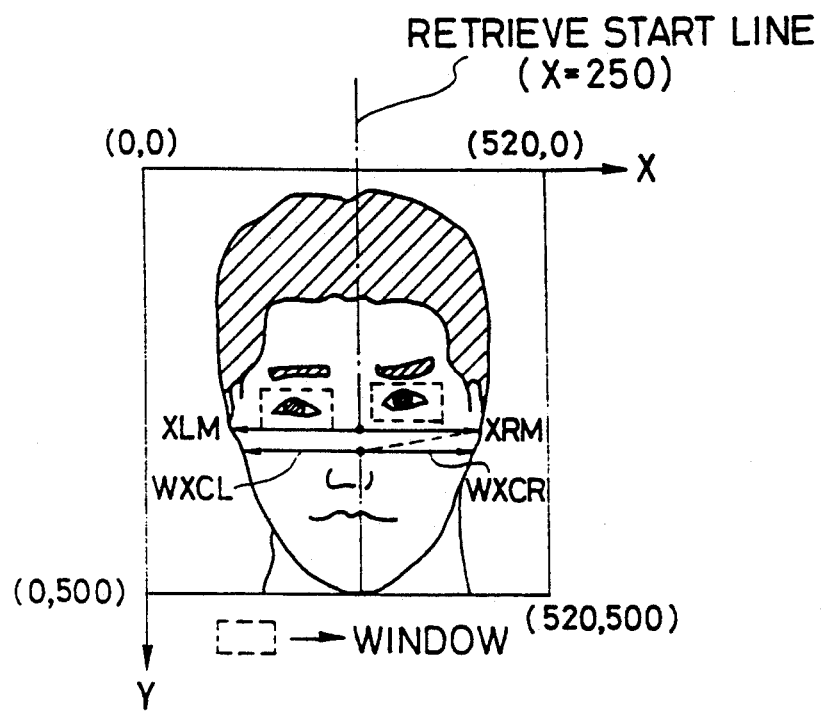
FIG. 10 is an illustration for assistance in explaining the procedure of detecting a face width beginning from a central line.

In more detail, the controller first sets the vertical scanning coordinate value to Y=40 (in step S200). This setting is made to increase the processing speed on the assumption that the maximum width of the face image will not exists within a range from Y=0 to Y=40. The controller sets the left side retrieve coordinate value XL and the right side retrieve coordinate value XR both to 250 (the horizontal retrieve scanning start line coordinate value) (in step S201). This X-coordinate value of X=250 indicates a line securely existing within a face image as far as a vehicle driver exists within an angle of view of the camera, as depicted in FIG. 10.

The controller checks whether the right side scanning end flag OKR is set as OKR=1 (in step S202). If YES, control retrieves the left side face image (in steps S210 and after). If NO (in step S202), the controller checks whether the pixel J(XR, Y) is bright (in step S203). If bright, the controller counts up a right side bright pixel continuation counter WXCR (in step S204) and further the retrieve X-coordinate counter XR (in step S205).

If not bright (in step S203), the controller sets the flag OKR (in step S206), compares the current end point XR with the maximum right side end point value XRM so far stored (in step S207), and set the current end point XR as a new right end point XRM if XR is larger than XRM (in step S208).

The same processing as described above is executed for the left side (in steps S210 to S216). The points different from the above-mentioned right side retrieval are that the retrieve X-coordinate value XL is counted down (in step S213); the current end point XL is compared with the minimum left side end point value XLM so far stored (in step S215); and the current end point XL is set as a new left end point XLM if XL is smaller than XLM (in step S216).

After both right and left end points have been detected on one scanning line, the controller sets both the scanning end flags OKL and OKR (in step S220). Further, the controller clears (or resets) these flags (in step S221) and increments the retrieved line Y (in step S222). The above processing is repeated until completed up to a previously determined Y direction scanning range (Y=500) (in step S223).

Figure 11:
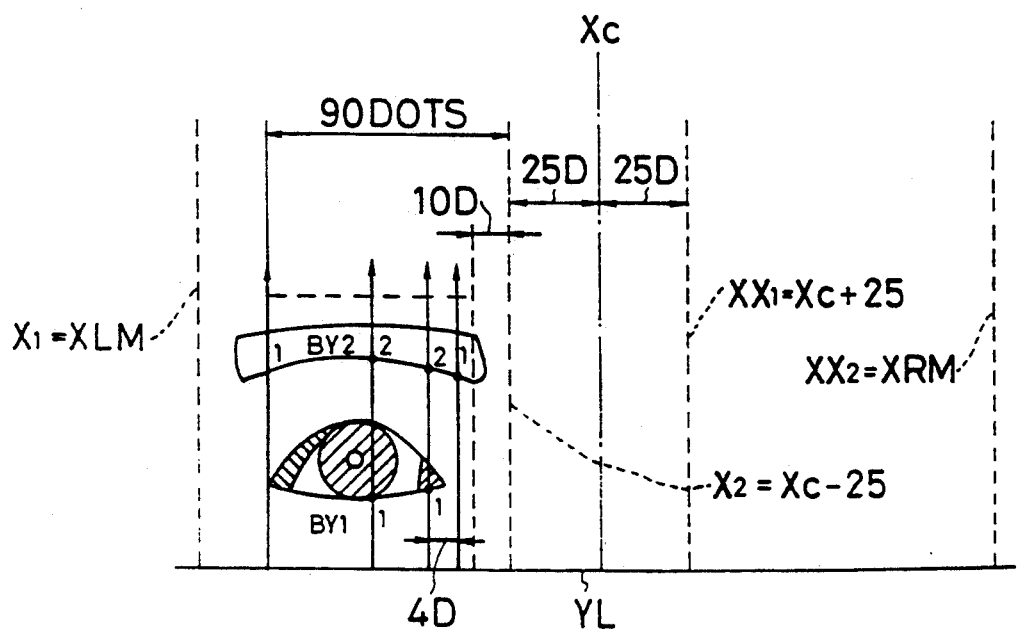
FIG. 11 is another illustration for assistance in explaining the processing of detecting the horizontal and vertical positions of an eye window.

When the right and left ends of the face image have been detected as described above, the horizontal direction positions of the windows can be determined in accordance with the following formulae, as depicted in FIG. 11:

X-axis center: Xc=XLM+(XRM - XLM)/2
Left side X of left eye window: $X_1$=XLM
Right side X of left eye window: $X_2$=Xc−25 (pixels)
Left side X of right eye window: $XX_1$=Xc+25 (pixels)
Right side X of right eye window: $XX_2$=XRM As described above, since both face right and left ends can be detected independently by scanning from the central line of the face image, that is, from roughly the middle portion of the face image toward both the right and left sides, in case either one of both the face side ends cannot be detected due to a strong external light (e.g., direct sunlight), it is possible to securely detect the opposite side end of the face. In addition, since the processing time can be shortened, it is possible to increase the calculation speed and therefore to improve response speed, even if the external light incident upon a running vehicle changes quickly and complicatedly.

FIG. 9 is a detailed flowchart for assistance in explaining the procedure of deciding the vertical positions of right and left eye window under consideration of the presence or absence of eyeglasses. This procedure can be roughly divided into two of two black (dark) area detecting procedure (FIG. 9A) and eyeglasses detecting procedure (FIG. 9B).

To retrieve the two black (dark) areas (eyeball and eyebrow) of the left eye, as shown in FIG. 11, a start point ($X_2$−10) is determined at a point 10 dots leftward from the right side X coordinate value $X_2$ of the left eye window, and an end point ($X_2$−90) is determined at a point 90 dots leftward from $X_2$. Further, the retrieval is executed beginning from the Y coordinate value YL to 0 in the vertical upward direction and in the horizontal leftward direction at regular intervals of 4 dots. Here, the Y coordinate value YL is determined lower than the scanning line along which the left and right end points XLM and XRM have been decided.

To retrieve the two black areas of the right eye, similarly a start point $(XX_1+10)$ is determined at a point 10 dots rightward from the left side X coordinate value $XX_1$ of the right eye window, and an end point $(XX_1+90)$ is determined at a point 90 dots rightward from $XX_1$. Further, the retrieval is executed beginning from the Y coordinate value YL to 0 in the vertical upward direction and in the horizontal rightward direction at regular intervals of 4 dots.

Figure 12:
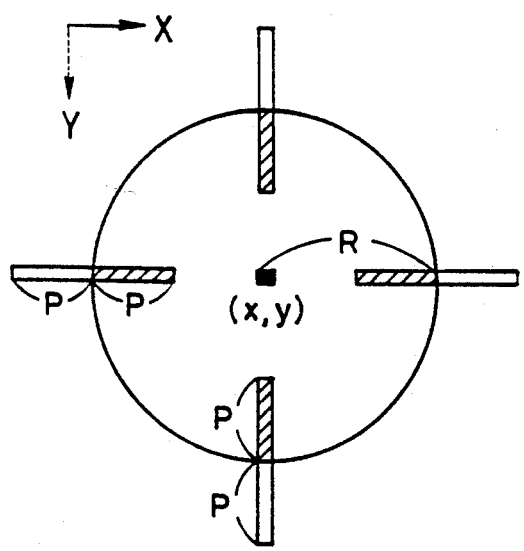
FIG. 12 is an illustration for assistance in explaining the principle of detecting an iris center.

Further, to check the presence or absence of eyeglasses as shown in FIG. 12, the retrieval range of the left eye is determined from the right side X coordinate value $X_2$ of the left eye window to the left side X coordinate value $X_1$ of the left eye window in the horizontal (X) direction. The retrieval range of the right eye is determined from the left side X coordinate value $XX_1$ of the right eye window to the right side X coordinate value $XX_2$ of the right eye window in the horizontal direction.

With reference to FIG. 9A, the procedure of deciding the vertical (Y) width of the left eye window will be explained hereinbelow.

The controller clears out memory variable BY1MAX representative of the maximum (lowermost point) Y coordinate value of the first black area (eyeball) and a memory variable BY2MAX representative of the maximum (lowermost point) Y coordinate value of the second black area (eyebrow), and initializes an X direction retrieval range determining counter X CHECK to $(X_2-10)$ and a Y direction retrieval range determining counter Y CHECK to YL (in step S301).

The controller checks whether all the retrieval points along the X-axis have been retrieved, that is, whether the X-direction retrieval range determining counter X CHECK is $(X_2-90)$ or less (in step S302). If NO, the controller clears out a flag FL1 indicative of the first area detection, a black pixel continuation counter BLACK, a white pixel continuation counter WHITE, a flag WHITEFL indicative of a 10 dots or more interval between the first black area and the second black area, a buffer BY1 for storing the maximum value of the first black area and a buffer BY2 for storing the maximum value of the second black area (in step S303).

The controller checks whether the retrieved dot is black (in step S304). If black, the controller clears out the white pixel continuation counter WHITE (in step S305), and counts up the black pixel continuation counter BLACK (in step S306). Further, the controller checks whether continuation counter BLACK is 1 (to check whether the black pixel is first detected) (in step S307). If 1, the controller stores the current Y coordinate value counted by the Y-direction retrieval range determining counter YCHECK as the lowermost point Y-coordinate value coordinate SETY of the black area (in step S308). This indicates that Y coordinate value "1", as shown in FIG. 11, for instance is stored. Further, the controller checks whether the number of black pixels counted by the black pixel continuation counter BLACK is 2 or more (in step S309). If 2 or more, the controller checks whether the FL1 indicative of the first black area detection is set (in step S310). If not yet set, the controller stores the value SETY to the buffer BY1 for storing the maximum value of the first black area and further sets the flag FL1 (in step S311). Thereafter, the controller counts down the Y-coordinate value YC to shift the retrieval to pixels arranged one line upward (in step S328). If the flag FL1 is set (in step S310), control checks whether the flag WHITEFL indicative of a 10 dots or more intervals between the first and second black areas is set (in step S312). If set, since this indicates that the second black area is detected, control stores the value SETY to the buffer BY2 for storing the maximum value of the second black area (in step S313). This indicates that Y-coordinate value "2", as shown in FIG. 11, for instance is stored. Further, if the flag WHITEFL is not set (in step S312), since this indicates that an interval between the first and second black areas is narrow and therefore the difference between the two is not clear, the controller checks whether the number of the continuous black pixels is more than 50 (in step S314). If yes, since this indicates that hair of a driver head is detected, control clears out the buffer BY2 (in step S315). If no (in step S314), control counts down the Y-coordinate counter YC to shift the retrieval to pixels arranged one line upward (in step 328).

Further, if the retrieved pixel is white (bright) (in step S304), control clears out the black pixel continuation counter BLACK (in step S316) and checks whether the flag FL1 indicative of the first black area detection is set (in step S317). If not set, since this indicates that any black area is not detected, control counts down the Y-coordinate value YC to shift the retrieval to pixels arranged one line upward (in step 328). If set (in step S317), the controller counts up the white pixel continuation counter WHITE (in step S318) and checks whether white pixels of 10 both or more continues (in step S319). If yes, since this indicates that an interval between the eyeball and the eyebrow or between the eyeball or an eyeglass frame is detected, the controller sets the flag WHITEFL indicative of a 10 dots or more interval between the first and second black areas (in step S320). If no (in step S319), the controller counts down the Y-coordinate value YC to shift the retrieval to pixels arranged one line upward (in step S328).

Further, the controller checks whether white pixels continue 80 dots or more (in step S321). If yes, since this indicates that a face is detected without detecting the eyebrow, the controller clears out the buffer BY2 for storing the maximum value of the second black area. If no (in step S321), the controller counts down the Y-coordinate value YC to shift the retrieval to pixels arranged one line upward (in step S328).

After the first black area candidate point is stored in the buffer BY1 and the second black area candidate point is stored in the buffer BY2, the controller compares the candidate point of the buffer BY1 with the maximum (lowermost point) BY1MAX of the first black area values so far stored (in step S323) and stores a larger candidate point as BY1MAX (in step S324). For instance, in FIG. 11, a middle portion 1 of the Y coordinate value is stored as BY1MAX. Thereafter, the controller compares the candidate point of the buffer BY2 with the maximum (lowermost point) BY2MAX of the second black area values so far stored (in step S325) and stores a larger candidate point as BY2MAX (in step 326). For instance, in FIG. 11, a point on the right side along the Y-coordinate is stored as BY2MAX.

As described above, the lowermost point BY1MAX of the first black area (eyeball) and that BY2MAX of the second black area (eyebrow) can be decided.

FIG. 9B shows a procedure of detecting the presence or absence of eyeglasses. The controller first checks whether no maximum value of the second black area is stored in the buffer BY2 (in step S329). If yes, since this indicates that the maximum value of the second black area is not stored in the buffer BY2 and the maximum value of the first black area is stored in the buffer BY1, control sets BYH=BY1+10 (in step S330). If no, since this indicates that the maximum value of the second black area is stored in the buffer BY2, control sets BYH=(BY1+BY2)/2 (in step S331). These steps (S330, S331) serve to obtain a Y-coordinate value BYH at which a bridge portion of an eyeglass frame is detected. Further, the eyeglass position BYH is determined at the intermediate point between BY1 and BY2 (in step S331). However, the BYH may be determined at any point between BY1 and BY2. The controller clears out the black pixel counter BLACKX for counting the number of black pixels (in step S332), sets an initial value $X_2$ or $XX_1$ to the pixel coordinate value XC as $XC=X_2$ or $XC=XX_1$ (in step S333) and an initial value BYH to the pixel coordinate value YC as YC=-BYH (in step S334). The controller further checks whether the pixel J(XC, YC) is black (in step S335). If yes, the controller counts the black pixel counter BLACKX in the X direction (in step S336). In this step, in the case of the left eye, the counter BLACKX is counted up from $XC=X_2$; and in the case of the right eye, the counter BLACKX is counted down from $XC=XX_1$ (in step S337). The controller checks whether the retrieval is executed beyond $XX_1$ in the case of the left eye, and below $X_2$ in the case of the right eye (in step S338). If yes (in step 338), control checks whether the value of the black pixel counter BLACKX is less than 3 (in step S339). If YES (less than 3) (in step 339), since this indicates that a middle (bridge) portion of an eyeglass frame is not detected, the controller counts up the eyeglass-absence counter MEGOFF (in step S340).

The above processing is executed within a retrieval range of the left eye, and the controller checks whether the eyeglass absence counter MEGOFF exceeds 5 (in step S341). If yes, since this indicates that eyeglasses are absent, control sets the two (top and bottom) Y-coordinate values YT and YB to determine the vertical window width as YT=BY1MAX−40 and YB=BY1-MAX+10 on the basis of the maximum Y-coordinate (lowermost point) value BY1MAX of the first black area (eyeball) (in step S342). Further, if no (in step S341), since this indicates that eyeglasses are present, control sets the two (top and bottom) Y-coordinate values YT and YB to determine the vertical window width as YT=BY2MAX−10 and YB=BY2MAX+40 on the basis of the maximum Y-coordinate (lowermost point) value BY2MAX of the second black area (eyebrow) (in step 343).

The above procedure is executed for both the left and right eyes to determine both the eye windows.

As described above, since the horizontal range of each window can be decided by dividing the face image into two halves on the right and left sides of the face width direction, in case the face image obtained by irradiating infrared rays thereupon is partially shaded according to the turning direction of the face, it is possible to independently obtain an eye window at least one half side of the face image.

Further, since the vertical window range can be decided by vertically scanning a black area between two points as small as 20 times, it is possible to accurately determine an eye window at high speed in both horizontal and vertical range without being subjected to the influence of the presence of shade or the change in lightness on the face image.

In addition, since retrieval is executed within a range under the eyebrow (at which the light density is almost constant without being subjected to the influence of a hat, hair, etc.), it is possible to accurately detect the eye existence area (window) or areas (windows), thus enabling an inattentive driving (doze, looking aside) to be prevented reliably.

After the eye window has been detected in accordance with the above-mentioned procedure on the basis of the light density signal J (X, Y) (step S5 in FIG. 3), an iris is detected as follows: an iris is observed as a dark circular area in general. FIG. 12 shows an illustration showing the principle of iris detection. A circle with a radius R is set at any given central point (x, y) within an eye window, and further four radial rectangles are set so as to across the circumference of the circle at regular angular intervals. Each of these rectangles extends by P pixels inside and outside the circle circumference. Further, a difference $\sigma$ in total lightness density between the outer bright (white) rectangles and the inner dark (black) rectangles is calculated by shifting the circle center to the left side, for instance (x, y) from the minimum radius (Rmin) to the maximum radius (Rmax) to obtain the maximum value $\Delta$ of the difference $\sigma$. The above calculation is repeated in both the horizontal and vertical direction at any given points within the detected eye window. The calculated maximum value of the difference $\sigma$ is stored.

The above calculation is executed to obtain an iris on the principle that if an iris is located within an eye window, since the iris is detected as a darker circle, as compared with other areas, the above difference $\sigma$ obtained with the iris as its center becomes the maximum.

Figure 13:
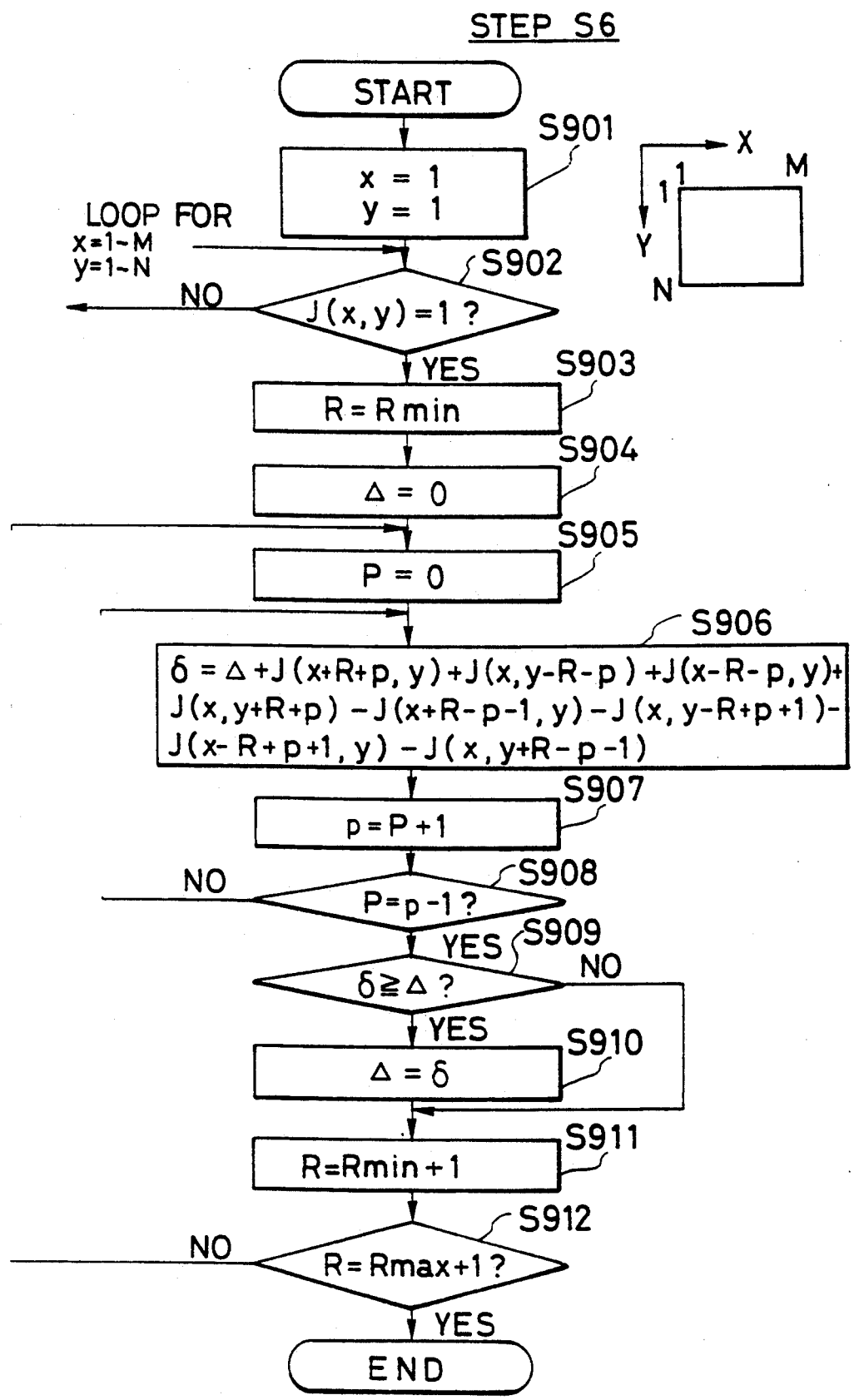
FIG. 13 is a flowchart for assistance in explaining the procedure of detecting an iris.
Figure 14:
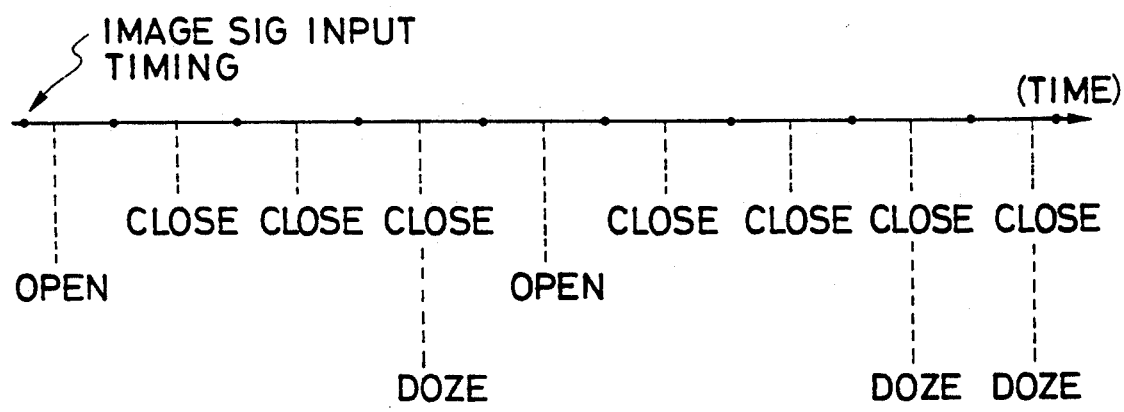
FIG. 14 is an illustration for assistance in explaining the discrimination of a doze.

FIG. 13 is a detailed flowchart for assistance in explaining the step of detecting iris center within the eye window (step S6). In the flowchart, the controller roughly executes the following steps of: (a) setting a circle with a radius R within an eye window and four radial rectangles crossing the circle circumference by p pixels; (b) calculating a difference in lightness between rectangles outside the circle and rectangles inside the circle at all pixels within the circle; and (c) determining an iris center at a point where the calculated difference is the maximum.

In more detail, control resets horizontal and vertical counters for scanning pixels within the window as x=1, y=1 (in step S901). Here, the window size is M dots in the horizontal (X) direction and N dots in the vertical (Y) direction. The controller checks whether the central point J (x, y) of an iris is black (in step S902). If black, control sets the detection radius as R=Rmin (in step S903) and resets $\Delta$ and p as $\Delta=0$ and p=0 (in steps 904 and 905).

Thereafter, control detects a black circular area enclosed by white portion (in steps S906 to S908). That is, the controller calculates the following difference (in step S906):

$$\sigma = \Delta + J(x + R + p, y) + J(x, y - R - p) +$$
$$J(x - R - p, y) + J(x, y + R + p) -$$
$$J(x + R - p - 1, y) - J(x, y - R + p + 1) -$$
$$J(x - R + p + 1, y) - J(x, y + R - p - 1)$$

where the above second to fifth terms indicate lightnesses (densities) at four points radially (R+p) pixels rightward, downward, leftward and upward away from the central coordinate value (x, y) and the above sixth to ninth terms indicate lightness (densities) at four points radially $R-(p+1)$ pixels rightward, downward, leftward and upward away from the central coordinate value (x, y). The above calculation is repeated by incrementing p as $p=p+1$ (in step S907) until $p-1$ reaches (where p is a set value) (in step S908). Therefore, control obtains the difference $\sigma$ in total density between the lightness value of the outer white rectangles (obtained by a sum total of the second to fifth terms in step S906) and that of the inner black rectangles (obtained by a sum total of the sixth to ninth terms in step S906) at a radius Rmin shown in FIG. 12 (in step S910).

The controller sets the radius as $Rmin+1$ (in step S911), and checks whether $R=Rmax+1$ (in step S912). If no, the controller repeats the steps S906 to S908 to obtain the brightness difference $\sigma$ between the outer and inner rectangles at a radius $Rmin+1$. If this lightness difference $\sigma$ is larger than $\Delta$ obtained at the first radius Rmin, this larger lightness difference $\sigma$ is set as the maximum value $\Delta$. The above steps are repeated until R reaches Rmax to obtain the maximum lightness difference $\Delta$ at any given points (x, y) (in step S912). The above calculation is repeated to determine a detection radial zone (from Rmin to Rmax) according to the iris radius because the iris radius to be detected is different according to the driver or the distance between the camera and the driver.

The above-mentioned processing is executed all over the window from $x=1$ to M and $y=1$ to N. The maximum value $\Delta$ thus obtained is a lightness difference at the center of an iris. Since the lightness difference $\Delta$ is much different when the eye is opened and closed, it is possible to determine that the eye is kept open or closed on the basis of the maximum lightness difference $\Delta$. By detecting the lightness difference in an iris, the driver's eye conditions (open or closed) can be detected quickly to detect inattentive driving.

In the inattentive drive discriminating process shown in step S7 in FIG. 3, when the maximum lightness difference calculated in step S6 is a predetermined threshold or more as $\Delta \geq Th$, the eye is determined to be open; and when less than the threshold as $\Delta < Th$, the eye is determined to be closed.

Further, since there exists a problem in that the above procedure discriminates a blink as that the eyes are closed, the above iris detection procedure is executed several times and an inattentive (dozing) driver is determined only when the eye closes are recognized in series several times or more.

That is, image signals are inputted at regular time intervals as shown by black dots as shown in FIG. 15. When the condition that both eyes are closed is detected beyond three times or more, a dozing driver is determined.

Further, when only one eye is determined to be closed, it is considered that the driver looks aside and therefore the one eye is dislocated out of the image. Therefore, when the iris detection processing determines that one eye is closed three times or more continually, the driver looking to one side is determined.

In summary, the controller roughly executes the following steps of:

(a) determining a threshold of lightness within the window; (b) comparing iris lightness with the threshold at regular time intervals to determine a closed eye when the detected iris lightness is less than the threshold and an open eye when more than, the threshold and (c) discriminating an inattentive drive when the determined closed eye condition continues beyond a predetermined time duration.

As described above, in the method of the present invention, an inattentive driver who is dozing (both eyes being closed) and looking aside (one eye being closed) can be discriminated by (1) obtaining one or two eye detection areas (face image sides); (2) detecting one or two eye windows under consideration for the presence or absence of eyeglasses; and (3) detecting one or two iris centers within the one or two eye windows. Therefore, in case the driver's face is irradiated by direct sunlight (the face image is not uniform on right and left sides) and therefore it is difficult to detect the eye positions on the bright side, in particular, since only a one eye detection can be made on the dark side of the face image, it is possible to detect the position of a single eye at high speed and with high reliability.

What is claimed is:

1. An eye position detecting system for detecting an eye position in a face image taken by a camera, comprising:
    (a) inputting means for inputting face image signals as light density gradation data;
    (b) binarizing means for binarizing the inputted face image signals;
    (c) deciding means for obtaining a one eye detection area on a dark side in the face image when the inputted light density gradation data are not uniform on the right and left sides of the face image behond a predetermined density level, said deciding means having:
        (1) discriminating means for discriminating density change points in a vertical direction on the basis of the binarized image signals to check whether the light density is not uniform on the right and left sides in the face image;
        (2) determining means for determining a threshold value only on the dark side of the face image; and
        (3) setting means for setting only one eye detection area on the dark side in the face image when the number of the discriminated density change points exceeds the determined threshold value.

2. The eye position detecting system of claim 1, wherein said deciding means comprises:
    (a) density detecting means for detecting light density on the basis of the image signals on both sides in the face image, separately;
    (b) comparing means for comparing the detected densities on both sides of the face; and
    (c) deciding means for obtaining only one eye detection area on the dark side of the face image when a difference in light density between both sides of the face image exceeds a predetermined level.

3. A method of detecting an eye position in a face image, comprising the steps of:
    (a) irradiating the face with infrared rays;
    (b) taking face images by a camera in synchronism with the infrared rays;
    (c) obtaining a one eye detection area on a dark side in the face image when the face image is not uniform in light density between right and left sides beyond a predetermined density level, the step including the steps of
        (1) determining a threshold level;
        (2) binarizing the face image signal on the basis of the determined threshold level;

(3) detecting density change points in a vertical direction on the basis of the face image signals to check whether face light density is not uniform on the right and left sides in the face image; and (4) obtaining only one eye detection area on one dark side of the face image when the number of the density change points exceeds a predetermined value;

(d) obtaining one eye window in the one eye detection area in the face image; and (e) detecting an iris center within the detected eye window to determine an inattentive driver on the basis of change in lightness at the detected iris.

4. The method of detecting an eye position of claim 3, wherein the step of obtaining one eye detection area comprises the steps of:

(a) detecting light density on the basis of the face image signals on both sides in the face image, separately;

(b) comparing the detected both-side light densities; and (c) obtaining only a one eye detection area on one dark side in the face image when a difference in light density between both sides of the face image exceeds a predetermined level.

5. The method of detecting eye position of claim 4, wherein the steps of detecting light density and obtaining only a one eye detection area comprises the steps of:

(a) retrieving a predetermined number of image signals at pixels in a horizontal direction within a lower half area of the face image beginning from the center to the right and left, respectively;

(b) calculating an average density on the basis of the retrieved image signals on the right and left sides of the face image, respectively;

(c) repeating the above steps (a) and (b) in a predetermined vertical range;

(d) checking whether a difference in average density between the right and left sides of the face image is beyond a predetermined value;

(e) if the checked difference is less than a predetermined value, determining the light density is uniform on the right and left sides of the face image and obtaining two eye detection areas on both sides in the face image;

(f) if the checked difference is the predetermined value or more, determining that the light density is not uniform on the right and left sides of the face image and obtaining a one eye detection area;

(g) comparing the right and left average densities; and (h) if the right average density is higher than the left average density, determining the eye detection area on the left side of the face image; and if the left average density is higher than the right average density, determining the eye detection area on the right side of the face image.

6. The method of detecting an eye position of claim 3, wherein the steps of detecting density change points and obtaining the one eye detection area comprises the steps of:

(a) retrieving a predetermined number of binarized image signals at pixels in a horizontal direction within a lower half area of the face image;

(b) calculating an average density on the basis of the retrieved image signals;

(c) checking whether the calculated average density is beyond a predetermined value to determine a continuous bright portion along the horizontal direction;

(d) checking whether the calculated average density is below another predetermined value to detect a density change point in the horizontal direction;

(e) repeating the above steps (a) to (d) along a vertical direction;

(f) counting the number of density change points along the vertical direction;

(g) if the counted number of the density change points is less than a predetermined value, determining that the light density is uniform on the right and left sides of the face image to decide two eye detection areas on both sides in the face image; and (h) if the counted number of the density change points is the predetermined value or more, determining that the light density is not uniform on the right and left sides of the face image to obtain a one eye detection area on a side of the face image where the continuous bright portion has not been checked.

7. The method of detecting an eye position of claim 3, wherein the step of obtaining an eye window comprises the steps of:

(a) determining a vertical central line of the face image;

(b) retrieving image densities at pixels in a horizontal direction beginning from the determined central line to the left side in the face image;

(c) determining a face left end point on the basis of a continuous bright portion along the horizontal direction;

(d) retrieving image densities at pixels in a horizontal direction beginning from the determined central line to the right side in the face image;

(e) determining a face right end point on the basis of a continuous bright portion along the horizontal direction;

(f) repeating the above steps (a) to (e) along a vertical direction to determine both the left and right face end points;

(g) determining left and right side positions ($X_1$, $X_2$) of the left eye window and left and right side positions ($XX_1$, $XX_2$) of the right eye window on the basis of both the determined face end points;

(h) retrieving image densities at pixels in a vertical direction at regular horizontal pixel intervals;

(i) determining an eyeball lowest end point (BY1) and an eyebrow lowest end point (BY2) on the basis of a continuous dark portion along the vertical direction, respectively;

(j) determining an eyeglass detecting vertical position value (BYH) between the two end points BY1 and BY2;

(k) detecting a dark bridge portion of an eyeglass frame along the horizontal direction at the vertical position value (BYH); and, (l) if no eyeglass is detected, determining upper and lower end points (YT, YB) on the basis of the eyeball lowest end point (BY1), and if eyeglasses are detected, determining the upper and lower end points (YT, YB) on the basis of the eyebrow lowest end point (BY2).

8. The method of detecting an eye position of claim 3, wherein the step of detecting an iris center comprises the steps of:

(a) setting a circle with a radius R within an eye window and four radial rectangles crossing the circle circumference by p pixels;

(b) calculating a difference in lightness between portions of rectangles outside the circle and portions of rectangles inside the circle for pixels within the circle; and (c) determining an iris center at a point where a calculated difference is the maximum.

9. The method of detecting an eye position of claim 3, wherein the inattentive driver can be determined by the steps of:

(a) determining a threshold value within the window;

(b) comparing an iris lightness difference with the threshold at regular time intervals to determine a closed eye when the detected iris lightness difference is less than the threshold and an open eye when more than the threshold; and (c) determining an inattentive driver when the determined closed eye condition continues beyond a predetermined time duration.

* * * * *